Dec. 28, 1954 S. HERMAN 2,698,392

PHASE SENSITIVE RECTIFIER-AMPLIFIER

Filed Nov. 20, 1953

INVENTOR:
SIDNEY HERMAN
BY
Hoag, Kilburn & Carlson
ATTORNEYS.

Patented Dec. 28, 1954

2,698,392

PHASE SENSITIVE RECTIFIER-AMPLIFIER

Sidney Herman, Brooklyn, N. Y.

Application November 20, 1953, Serial No. 393,344

12 Claims. (Cl. 307—25)

Figure 1:
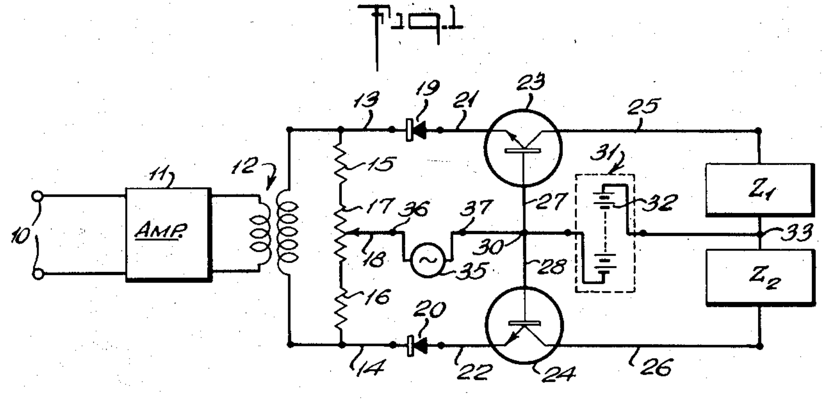

The present invention relates to a phase sensitive rectifier and amplifier, and more particularly to such an amplifier using semiconductors.

Most control equipment, such as servos, regulators, etc. use alternating current indicating devices as transducers, usually including inductive components. It is desirable to convert the alternating current to direct current for efficiently using the input energy to drive the equipment to be controlled. A preamplifier is often employed to raise the signal level; then a demodulator, or rectifier, is used to convert the amplified signal to direct current. Further amplification may be necessary in accordance with the power requirements of the equipment to be controlled. Compensating networks, stabilizing networks, and the like are introduced if necessary somewhere in the system, usually in the direct current section.

Devices for such purpose, now commonly employed, have the drawback of large weight when using magnetic amplifiers, or rather low efficiency when using vacuum tubes, due to the requirement for heater current, which is continuous, even though the equipment is used only intermittently, and the resulting heat from the vacuum tubes may raise the temperature of the space in which they are confined to a degree which is objectionable and may require cooling equipment to be installed.

It is accordingly an object of the present invention to provide a phase sensitive rectifier-amplifier which is light in weight, small, and yet has high efficiency, and without any objectionable heating effect.

It is another object of the present invention to provide a rectifier-amplifier which is rugged, resistant to mechanical disturbances, and reliable in operation, yet compact and of small size.

In accordance with the present invention, I employ semiconductors, in a circuit which is so designed as to avoid bulky magnetic or saturable components. The exact values of the components may be readily determined by engineers skilled in the art; general reference may be had to "Proceedings of the Institute of Radio Engineers," Vol. 40, No. 11, November 1952 entitled "Transistor Issue" where applications, and design considerations are fully discussed, and further exhaustive bibliographies are given.

The present invention essentially consists in providing a balanced, center tapped impedance in parallel with an input impedance; preferably the center tapped impedance is a resistance unit, which can be easily adjusted for perfect balance. The input impedance may be any conventional small, unsaturated choke, transformer, condenser, or another resistance, as desired, and dictated by design considerations for specific applications. The output of the center tapped impedance will then provide a pair of lines, and a center, or "common" connection, so that a double ended network is formed providing two directional signals which are usual in control applications. A pair of rectifiers, which preferably are of the silicon or germanium crystal type, are connected in series with the lines—one for each line—and the output of these rectifiers is taken to the line terminals, to which the line terminals of a load may be applied. The center, or common connection, is connected to one side of an alternating current power source, of the same frequency as the input signal. The other side of the power source then forms the common, or center terminal for the output of the device according to the invention. When there is no input signal the current flowing through the two branches of the center tapped impedance will be equal; current flow through the lead components will be in opposite direction, and the controlled equipment will be held at a rest position, since the effects of the currents will be equal and opposite. However, when an input signal is applied the unbalance will be introduced into the double ended network, and the currents through the loads will no longer be equal, causing the desired operation of the load components.

The load components may be differential relays, each one of the components being formed by one coil; or two individual relays may be used; or the output may be directly applied to split field, or split armature type motors. It is to be understood that the application of the invention to various loads is not limited to the type of load indicated, since the load itself forms no part of the invention, and adaptation of the invention for particular applications is conventional.

Figure 2:
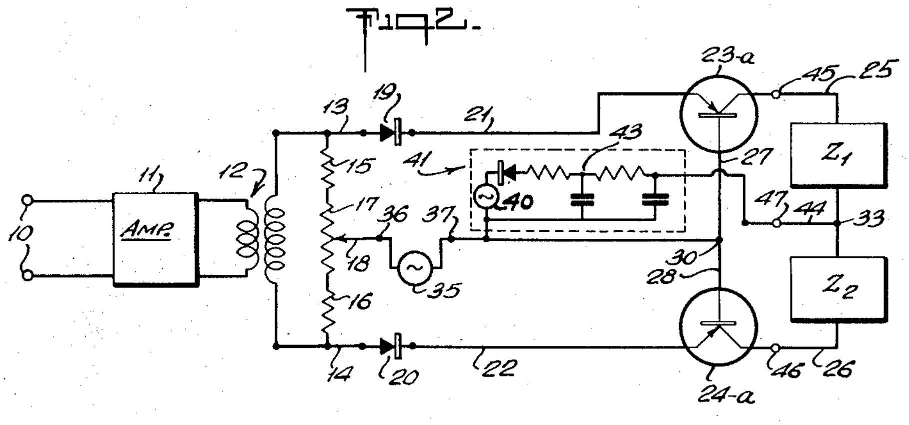

The invention will best be understood if the following description is read in connection with the accompanying drawings, in which, Figure 1 is a schematic wiring diagram of a rectifier-amplifier embodying the invention; and Figure 2 is a schematic diagram showing a modified form.

Referring now particularly to Figure 1, 10, 10 are the terminals to which an input signal is to be applied. If desired for the purposes of a particular application of my invention a preamplifier, 11, of known kind may be used, having its output connected to an ordinary output transformer 12, forming an input impedance for the rectifier-amplifier. Other output coupling, such as a capacitative coupling may also be used. The input signal should be in phase or 180° out of phase with the power source 35 described herein.

The secondary of transformer 12 is connected to lines 13 and 14. Connected in parallel with the input impedance, here transformer 12, is a balanced, center tapped impedance, which preferably is formed of fixed resistance units 15 and 16, and an adjustable resistance 17 so that the electrical center of the total resistance of units 15, 16, and 17 may be accurately established. Lines 13 and 14 are connected to rectifiers 19, 20; and the rectifiers 19, 20 are in turn connected to lines 21, 22. Connected to lines 21, 22 are n-p-n type transistors 23, 24, having their emitter electrodes connected to lines 21, 22 respectively, and their collector electrodes connected to the output leads 25, 26. Output leads 25, 26 are connected to loads $Z_1$ and $Z_2$, respectively, which may be relay coils, as previously explained.

The base connections of transistors 23, 24 are connected over leads 27, 28 to a common terminal 30. A source of power 31, such as a battery 32 is connected between terminal 30 and a common connection 33 of loads $Z_1$, $Z_2$. The polarity of the battery is indicated at Figure 1 and is conventional with the particular type transistor used.

A source of power 35 for phase reference and bias potential which may be an alternating current power line is connected to terminals 36, 37. These terminals are in series with the tap 18 of resistor 17 and common terminal 30, so that a pair of closed circuits will be established as follows: terminal 36, tap 18, thence splitting through impedance 15—16; thence one branch 13, 19, 21, 23, 27, terminal 30 to terminal 37; and the other branch 14, 20, 22, 24, 28, 30 to terminal 37. The currents in lines 21, 22 will be rectified due to the action of rectifiers 19, 20 to provide direct current bias potential for the transistors 23, 24. These currents will be equal, and since the transistors are connected in opposition, as shown, the currents through the loads $Z_1$, and $Z_2$, will be equal and in opposite direction, so that, if these loads represent coils of a differential relay, the relay will be held in an equal position. When however, a control signal is introduced by means of transformer 12, the currents in lines 21, 22 will become unbalanced, thereby changing the previously balanced bias on transsistors 23, 24, rendering one more conductive than the other, and causing unbalanced currents to flow through leads 25, 26 to the loads $Z_1$ and $Z_2$. The power delivered to these loads can be greatly amplified over the power available at transformer 12, yet the unit may be very compact and efficient as very little power is wasted by conversion into heat as is done in heating the filaments of vacuum tubes when devices using vacuum type tubes are employed.

Figure 2 illustrates a number of modifications which may easily be carried out; like reference numerals refer to like parts of Figure 1. The battery 32 of power source 31 may be replaced by a source of alternating current power 40 in combination with a dry rectifier 42, cuit 41 of conventional design, comprising rectifier 42, and filter network 43. Lines 25, 26, and the common line from terminal 33, here shown as line 44 may be connected to terminals 45, 46, 47, at which point filter networks, compensating network, or ripple smoothing networks may be connected; these networks are conventional and well known in the art. The transistors 23–*a*, 24–*a* shown are of the p-n-p type, and therefore the polarity of the rectifiers 19, 20, and of the source of power 41 has been reversed with respect to the polarity of the rectifiers 19, 20 and battery 32, of Figure 1.

In operation, a system using power supply 41 has the advantage that no power source is necessary other than an ordinary line cord to a conventional line socket or plug. When the system is idle, i. e. when it is in balance, the power consumption is very small and may readily be limited to a negligible value by suitable design of the resistances 15 and 16. A further advantage of the system over one using vacuum tubes is that the emitter resistance of the transistors 23, 24, or 23–*a*, 24–*a* is low, and the collector resistance is high, while the opposite is true for a similar vacuum tube circuit. Therefore there is little loss of power from the signal power source applied to input 10, or from the reference and bias power source 35.

It is therefore seen that I have provided a phase sensitive amplifier and rectifier, which is essentially characterized in that a center tapped impedance 15, 16, 17 is connected in parallel with an input circuit (10, 11, 12) to establish a double ended network; a pair of transistors 23, 24 are symmetrically connected to the outside terminal points of the center tapped impedance so as to provide amplification for power to be delivered to a balanced, center tapped load; and a source of reference voltage, 35, is connected to the center tap 18 of the impedance 15, 16, 17 on the one hand, and to the transistors on the other, so as to provide a balanced reference voltage which will cause equal currents to flow in opposition through the balanced load, but permit large unbalanced currents to flow through the load when an input signal appears across the input circuit, and therefore also across the center tapped impedance.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawing is to be interpreted as illustrative and not in a limiting sense.

What I claim is:

1. A phase sensitive amplifier-rectifier, comprising a center tapped impedance having a pair of outside terminals and a center terminal, a pair of transistors, having their emitter electrodes each connected to an outside terminal, and having their collector electrodes connected to a load, and a pair of terminals adapted to be connected to a source of power, one, of said pair of terminals being connected to the center terminal of the center tapped impedance, and the other of said pair of terminals being connected to the bases of both transistors of said pair of transistors.

2. A phase sensitive amplifier-rectifier, comprising a center tapped impedance having a pair of outside terminals and a center tap terminal, a pair of rectifiers, connected to said outside terminals respectively, a pair of transistors, having their emitter electrodes connected to said rectifiers respectively, each rectifier being in series between an outside terminal and a transistor, a balanced, center tapped load, having its center tap connected to the bases of the transistors, and the other load terminals connected to the collector electrodes of the transistors, and a pair of terminals, adapted to be connected to a source of power, one of said terminals being connected to the center tap terminal of said center tapped impedance, and the other of said terminals being connected to the bases of said transistors.

3. A phase sensitive amplifier-rectifier as claimed in claim 2, wherein the source of power is an alternating current source.

4. A phase sensitive amplifier-rectifier as claimed in claim 2, including a source of potential connected between the center tap of the load and the cases of the transistors.

5. A phase sensitive amplifier-rectifier as claimed in claim 2, including a rectifier network connected to a source of power, and means connecting the output of said rectifier network in series with the center tap of the load, and the bases of the transistors, to provide a source of direct current potential for the transistor collector-load-base circuit.

6. A phase sensitive rectifier-amplifier, comprising a balanced, center tapped impedance to establish a symmetrical, double ended network, a pair of amplifier means, each connected to one outside terminal of said center tapped impedance, and connection means adapted to be connected to a source of power in series with the center tap of said impedance and the amplifier means, so that signals impressed across the center tapped impedance will disturb the balance of the amplifier means and amplification of each amplifier means of the pair will be different from the other.

7. A phase sensitive rectifier-amplifier, comprising a single ended input impedance unit, a balanced, center tapped impedance in parallel with said impedance unit to establish a symmetrical, double ended network, a pair of rectifier means, each connected on one side to the respective terminals of said center tapped impedance unit, amplifier means connected to the other side of said rectifier means, and connection means adapted to be connected to a source of alternating current power in series with the center tap of said impedance, and the amplifier means, so that the rectifier means will rectify power introduced through the connection means, and simultaneous amplification will be effected under control of signals impressed upon the input impedance unit.

8. A phase sensitive rectifier-amplifier as claimed in claim 7, wherein the balanced, center tapped impedance is a center tapped resistance unit.

9. A phase sensitive rectifier-amplifier as claimed in claim 7, wherein the balanced center tapped impedance comprises a pair of fixed resistances and a tapped, variable resistance connected between said fixed resistances.

10. A phase sensitive rectifier-amplifier as claimed in claim 7, including a split load, having its outside terminals connected each to one terminal of said amplifier means, and its common terminal connected to another terminal of both of said amplifier means.

11. A phase sensitive rectifier-amplifier as claimed in claim 7, including a preamplifier unit connected to said input impedance unit.

12. A phase sensitive rectifier-amplifier, comprising a single ended input impedance unit, a balanced, center tapped resistance in parallel with said impedance unit to establish a symmetrical, double ended network, a pair of dry rectifiers, each connected on one side to the outside terminals of said center tapped resistance, a pair of transistors, each having their collector electrodes connected to the other side of each of said dry rectifiers respectively, a symmetrical split load, having its outside terminals connected to the collector electrodes of said transistors, a common connection point connected to the bases of both of said transistors, a source of potential connected between said common connection point and the common terminal of the split load, and a source of alternating current power connected in series with the center tap of the resistance and the common connection point, so that the currents from the source of alternating current power to the rectifiers, transistors, and the components of the split load will be equal, and, when an additional potential is introduced across the input impedance unit, the currents will become unequal thus effecting a power change to a greater extent than a power change solely due to said additional potential.

References Cited in the file of this patent

UNITED STATES PATENTS

| Number | Name | Date |
|---|---|---|
| 2,653,282 | Darling | Sept. 22, 1953 |